United States Patent [19]

Bronicki

[11] Patent Number: 4,542,625
[45] Date of Patent: Sep. 24, 1985

[54] GEOTHERMAL POWER PLANT AND METHOD FOR OPERATING THE SAME

[76] Inventor: Lucien Y. Bronicki, 23 Keren Kayemet St., Rehovot, Israel

[21] Appl. No.: 632,831

[22] Filed: Jul. 20, 1984

[51] Int. Cl.³ .............................................. F03G 7/04
[52] U.S. Cl. ..................................... 60/641.2; 60/655
[58] Field of Search .................... 60/655, 641.2, 641.5, 60/649, 673

[56] References Cited

U.S. PATENT DOCUMENTS 3,266,246  8/1966  Heller et al. ........................ 60/655
3,995,428 12/1976  Roberts ............................. 60/641.2

Primary Examiner—Stephen F. Husar
Attorney, Agent, or Firm—Sandler & Greenblum

[57] ABSTRACT

A geothermal power plant for operating on geothermal fluid includes an open cycle power plant responsive to the geothermal fluid for producing power and producing heat depleted geothermal fluid. Associated with the open cycle power plant is a closed Rankine cycle organic fluid power plant for producing power. Heat from the geothermal fluid is transferred to the closed cycle power plant; and heat depleted geothermal fluid is injected into a rejection well. The open cycle power plant includes a condenser that operates at a pressure greater than or equal to about atmospheric pressure with the result that the condenser is directly vented to the rejection well. Uncondensible gases contained in the geothermal fluid are thus passed directly into the rejection well making the power plant environmentally acceptable. The operation of the condenser at a pressure greater to or equal to atmospheric pressure eliminates the need for a vacuum pump and thus increases the useful work produced by the hybrid power plant so constructed, and simplifies its design and operation. The same approach is applicable to elimination of noncondensible gases in steam produced in industrial processes rather than from a geothermal well.

10 Claims, 4 Drawing Figures

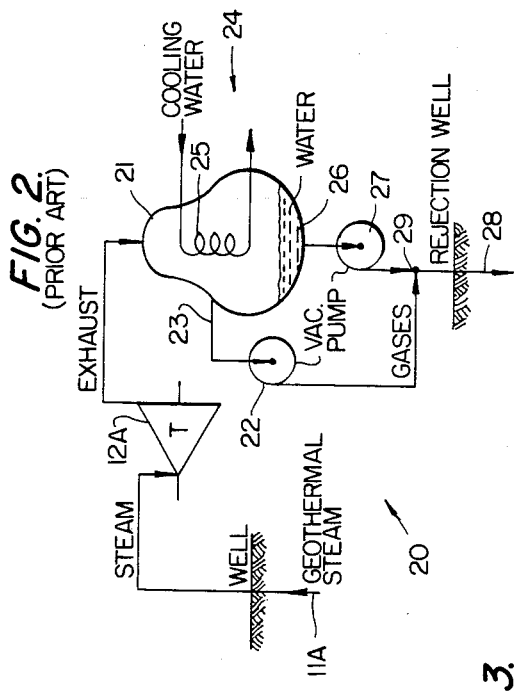
FIG. 1.
(PRIOR ART)
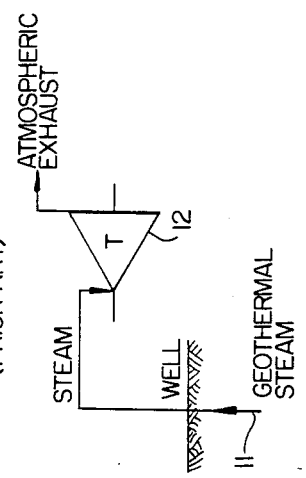
FIG. 3.
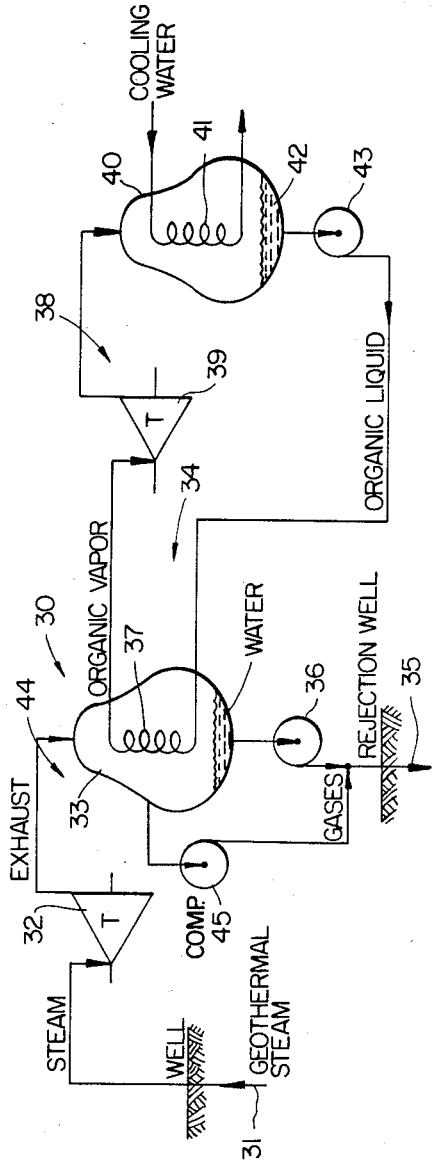

GEOTHERMAL POWER PLANT AND METHOD FOR OPERATING THE SAME

TECHNICAL FIELD

This invention relates to a geothermal power plant of the type having a production well for producing heated geothermal fluid used by the power plant to generate useful work, and a rejection well for receiving heat depleted geothermal fluid, hereinafter termed a geothermal power plant of the type described, and to a method for using the same.

BACKGROUND OF THE INVENTION

A simple geothermal power plant includes a heat engine responsive to geothermal fluid extracted from a production well for converting some of the heat in the fluid into useful work. Construction and operation are simplified if heat depleted geothermal fluid exhausted from a heat engine were exhausted directly into the atmosphere. However, geothermal fluid almost always contains sizeable amounts of noncondensible gases such as carbon dioxide and hydrogen sulfide, and sometimes the fluid contains large quantities of other gases. In such case, exhausting a heat engine into the atmosphere is usually prohibited for environmental reasons.

Because of environmental regulations, and in order to extract more work from the geothermal fluid, the conventional approach is to exhaust the heat engine into a condenser to which cooling water is indirectly applied for the purpose of increasing the temperature drop across the heat exchanger and thus increasing the thermal head on the heat engine. In such case, the condenser must be operated at a vacuum; and to this end, a relatively large capacity vacuum pump is required because of the presence in the geothermal fluid of noncondensible gases which are pumped back into a rejection well instead of being exhausted to the atmosphere. In addition to the vacuum pump, a condensate pump is also required to pump the condensate into the rejection well. Thus, the greater thermal efficiency achieved by utilizing a water cooled condenser is achieved at the expense of more complex and costly equipment, as well as a requirement for directing a sizeable percentage of the useful work produced by the heat engine into pump power for the vacuum. In addition, the amount of gases present in the geothermal fluid extracted from a production well often increases during the life of a well with the result that the capacity of the vacuum pump required will increase with the age of the well.

It is therefore an object of the present invention to provide a new and improved geothermal power plant of the type described and to a method for using the same, wherein the overall efficiency of the plant is improved.

DESCRIPTION OF INVENTION

According to the present invention, a geothermal power plant of the type described includes a heat engine responsive to heated geothermal fluid for generating power, a heat sink for absorbing heat, and a primary condenser operatively associated with the heat sink and responsive to geothermal fluid exhausted from the heat engine for operating at a pressure greater than or equal to about atmospheric pressure to produce heat depleted geothermal fluid. The invention also includes means for returning heat depleted geothermal fluid from the primary condenser to a rejection well, and means (such as a simple compressor) for directly venting noncondensible gases from the primary condenser into the rejection well.

By maintaining the pressure in the primary condenser at a level at or above atmospheric pressure, a vacuum in the primary condenser is avoided. Moreover, removal from the condenser of noncondensible gases into the rejection well is simplified because only a compressor is required rather than a vacuum pump and a compressor. Because the pressure in the primary condenser is increased over its conventional value, the presence of noncondensible gases in the primary condenser have a reduced adverse effect on the heat transfer coefficient; and, as a result, the area of the heat transfer surface in the primary condenser can be reduced from its conventional value. Thus, variations in the amount of noncondensible gases in the primary condenser have a reduced efect on the operation of the system.

Preferably, the heat sink includes a closed, Rankine cycle organic fluid power plant. The organic fluid power plant includes a vaporizer containing organic fluid operatively associated with the primary condenser for producing a vapor, a turbine responsive to the vapor for generating power and producing heat depleted vapor, and a second condenser responsive to vapor exhausted from the turbine for condensing vapor into condensate liquid, and means for returning the condensate liquid to the vaporizer. The second condenser is indirectly cooled, either with cooling water obtained from a cooling tower, or with air.

While the operation of the primary condenser at a level at or greater than atmospheric pressure limits the work that the geothermal fluid heat engine of the power plant can produce, the closed, Rankine cycle organic fluid power plant serves the purpose of extracting heat from the primary condenser and supplying that heat to a turbine thus making the hybrid power plant so constructed more efficient.

The present invention is also applicable to power plants other than geothermal power plants for removing noncondensible gases from a source of steam. In addition, the present invention is applicable to industrial processes that utilize steam as well as to steam produced by geothermal wells.

DESCRIPTION OF DRAWINGS

Embodiments of the invention are shown in the accompanying drawings wherein:

FIG. 1 represents a prior art geothermal power plant;

FIG. 2 is a schematic drawing of a conventional geothermal power plant of the type described;

FIG. 3 is a schematic block diagram of a geothermal power plant according to the present invention and FIG. 4 is a schematic block diagram of a another embodiment of a geothermal powerplant according to the present invention.

DETAILED DESCRIPTION

Figure 4:
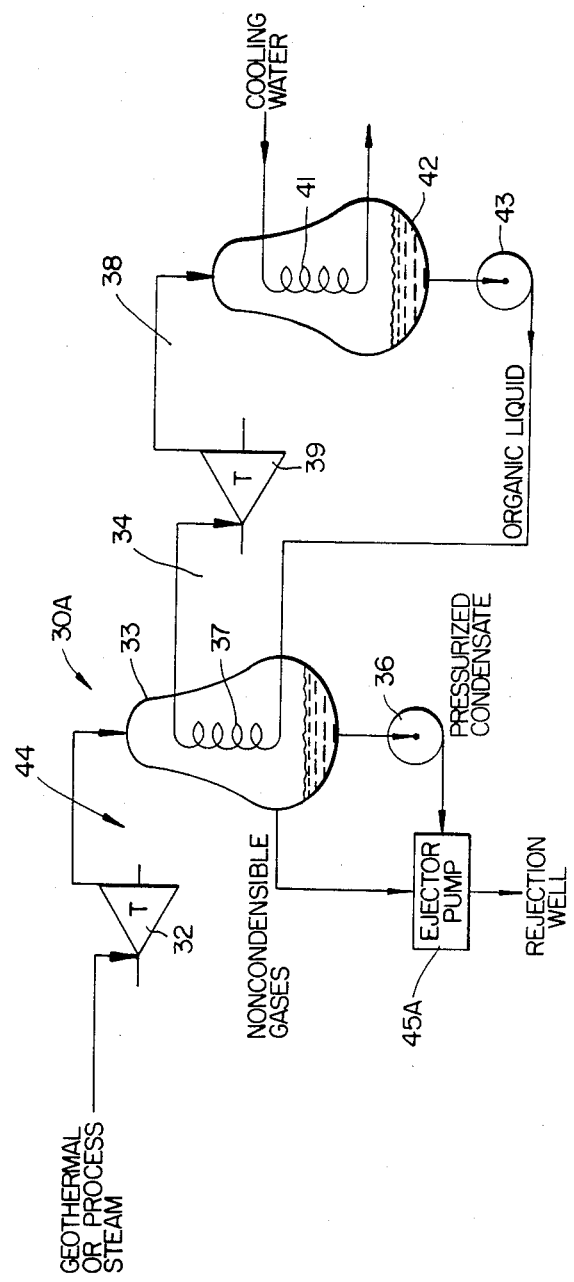

Referring now to the drawing, reference numeral 10 in FIG. 1 represents a simple geothermal power plant which is suitable for use where the geothermal fluid contains only small amounts of noncondensible gases whose release to the atmosphere is acceptable. Power plant 10 thus includes production well 11 which produces geothermal steam, and steam turbine 12 responsive to the steam from the production well for driving a generator (not shown) and producing useful work. As indicated in FIG. 1, turbine 12 exhausts directly to the atmosphere.

As indicated previously, environmental regulations usually restrict atmospheric exhaust because of the large quantities of noncondensible gases such as carbon dioxide and hydrogen sulfide, and possibly ammonia, contained in the geothermal fluid extracted from the production well associated with the power plant. In order to avoid environmental contamination by the geothermal fluid, and in order to increase the thermal head on the turbine thereby increasing the amount of useful work that can be extracted from the geothermal fluid, the arrangement shown in FIG. 2 can be utilized. Geothermal power plant 20 shown in FIG. 2 comprises production well 11A producing geothermal fluid and steam turbine 12A which is responsive to the geothermal fluid produced from the production well for driving a generator (not shown) and producing useful work. Turbine 12A exhausts to primary condenser 21 which is an evacuated shell maintained at a vacuum by the operation of vacuum pump 22 whose input 23 is connected to the primary condenser. Heat sink 24 permits heat from the condenser to be rejected; and to this end, cooling water is pumped into heat exchanger coil 25 contained within the condenser for the purpose of cooling and condensing the vapor exhausted form turbine 12A. Condensed vapor in the form of water 26 at the bottom of the condenser is pumped by means of pump 27 into rejection well 28 associated with the power plant.

Vacuum pump 22 maintains the pressure in the condenser at a low value consistent with the temperature of the cooling water by continuously evacuating from the condenser noncondensible gases that enter the condenser with the exhaust from turbine 12a. These noncondensible gases are injected at 29 into rejection well 28 thereby preventing their escape to the atmosphere.

Power plant 20 will generally be more efficient than power plant 10 because the presence of condenser 21 will permit turbine 12A to extract more work from the geothermal fluid than would be the case were the condenser not present. However, the large volume of noncondensible gases contained in geothermal fluid requires vacuum pump 22 to be so large and to require such an amount of work that the net useful work produced by power plant 20 is often not very much greater than could be obtained with an atmospheric exhausting power plant of the type shown in FIG. 1. However, power plant 20 has the advantage of limiting environmental contamination by noncondensible gases contained in geothermal fluid. For this reason, power plant 20 is environmentally acceptable although the cost per kilowatt hour of useful work is considerably more in power plant 20 than in power plant 10.

Power plant 30, shown in FIG. 3, is in accordance with the present invention. It includes production well 31 producing geothermal fluid which may be high in noncondensible gases. The fluid is applied to conventional steam turbine 32 which converts some of the heat contained in the geothermal fluid into useful work by driving a generator (not shown). Heat depleted geothermal fluid is exhausted from turbine 32 into primary condenser 33 which is operatively associate with heat sink 34 such that the condenser operates at a pressure greater than approximately atmospheric pressure. Turbine 32, as a consequence of this arrangement, will produce less work than a turbine configured as shown in FIG. 2; but, condenser 33 operates without the necessity for having a vacuum pump. Being at a pressure in excess of atmospheric pressure, the noncondensible gases contained within the condenser, carried there by the geothermal fluid exhausted from turbine 32, are vented directly into rejection well 35 by means 45, such as a simple compressor. The condensate produced by condenser 33 may be piped directly into the rejection well or the pressure can be increased by pump 36.

As can be seen in FIG. 3, heat exchanger 37 contained within condenser 33 is operatively associated with heat sink 34 for the purpose of conveying heat from the geothermal fluid from condenser 33. This heat is utilized in a closed, Rankine cycle organic fluid power plant indicated generally at 38. An example of a suitable organic fluid power plant is disclosed in U.S. Pat. No. 3,393,515 the disclosure of which is hereby incorporated by reference. Heat exchanger 37 operates as a vaporizer for the organic fluid contained within power plant 38. The vaporizer produces organic vapor which is applied to organic vapor turbine 39. Some of the heat contained within the organic vapor is extracted by turbine 39 which drives a generator (not shown) producing useful work. Heat depleted organic vapor is exhausted into secondary condenser 40 where condensation takes place by reason of the presence of the heat exchanger 41 through which cooling water is pumped. The condensed organic fluid 42 is returned by pump 43 to heat exchanger 37 completing the organic fluid cycle.

Power plant 30 is thus a hybrid power plant comprising a portion 44 which operates on geothermal fluid and a portion 38 operating on organic vapor. The heat recovery of the hybrid power plant is essentially the same as the heat recovery from power plant 20 shown in FIG. 2. However, the useful work produced by power plant 30 will exceed the useful work produced by power plant 20 under the same conditions because power plant 30 does not require a vacuum pump in connection with the primary condenser.

A power plant according to another aspect of the present invention is shown in FIG. 4 and designated by reference numeral 30A. Power plant 30A is essentially the same as power plant 30 shown in FIG. 3 except that pump 36 for pressurizing condensate in the condenser delivers the pressurized condensate to ejector pump 45A which is effective to compress noncondensible gases in the condenser. The compressed noncondensible gases and the compressed condensate are directed to a rejection well as shown in the drawing.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. A method for operating a geothermal power plant for generating power from geothermal steam containing noncondensible gases comprising:
   (a) applying the geothermal steam to a steam turbine for producing work and exhaust steam;
   (b) extracting heat from the exhaust steam in a steam condenser for collecting noncondensible gases and producing steam condensate such that the steam condenser operates at a pressure greater than or equal to about atmospheric pressure; and
   (c) pressurizing said noncondensible gases from the condenser in a compressor;

(d) pressurizing said condensate; and (e) returning the pressurized, noncondensible gases and the pressurized condensate to a rejection well.

2. A method according to claim 1 wherein heat is extracted from the steam condenser by supplying an organic fluid to the steam condenser for vaporizing the organic fluid, applying the vaporized organic fluid to an organic fluid turbine for producing work and exhausting organic vapor, applying exhaust organic vapor to an organic fluid condenser, and extracting heat from the organic fluid condenser for producing condensate that is furnished to the steam condenser.

3. A method according to claim 2 wherein the organic fluid cycle is separate from the geothermal steam cycle.

4. A geothermal power plant having a production well for producing heated geothermal fluid containing noncondensible gases for use by the power plant to generate power, and a rejection well for receiving heat depleted geothermal fluid, comprising:

(a) a heat engine responsive to the heated geothermal fluid for generating power;

(b) a heat sink for absorbing heat;

(c) a primary condenser operatively associated with the heat sink and responsive to geothermal fluid exhausted form the heat engine for operating at a pressure no less than about atmospheric pressure to produce heat depleted geothermal fluid;

(d) means for returning heat depleted geothermal fluid from the primary condenser to the rejection well; and (e) compressor means for compressing said noncondensible gases and for directly venting said noncondensible gases from the primary condenser into the rejection well.

5. A geothermal power plant according to claim 4 wherein the heat sink includes a closed, Rankine cycle power plant that operates with a fluid different from the geothermal fluid.

6. A geothermal power plant according to claim 5 wherein the organic fluid power plant includes a vaporizer operatively associated with the primary condenser and containing an organic fluid for producing organic vapor, an organic fluid turbine responsive to said vapor for generating power and producing heat-depleted vapor, a second condenser responsive to the vapor exhausted from the organic fluid turbine for condensing vapor into condensate liquid, and means for returning the condensate liquid to the vaporizer.

7. A geothermal power plant according to claim 6 including means for cooling the second condenser.

8. A geothermal power plant for operating on geothermal steam comprising:

(a) an open cycle power plant responsive to the geothermal steam for producing power and producing heat depleted geothermal steam;

(b) a closed Rankine cycle power plant operating on an organic fluid for producing power;

(c) means for transferring heat from the heat depleted geothermal steam to the closed Rankine cycle power plant;

(d) said means for transferring heat including a condenser that operates at a pressure greater than or equal to about atmospheric pressure for producing geothermal condensate and collecting noncondensible gases;

(e) means for pressurizing said geothermal condensate and injecting it into a rejection well; and (f) a compressor for pumping noncondensible gases from the condenser into said rejection well.

9. A power plant for operating on steam containing noncondensible gases comprising:

(a) an open cycle power plant responsive to said steam for producing power and having a primary condenser that operates at a pressure greater than or equal to atmospheric pressure;

(b) a closed Rankine cycle power plant operating on an organic fluid for producing power;

(c) means for rejecting heat from the primary condenser to the closed Rankine cycle power plant; and (d) means for compressing noncondensible gases from the primary condenser and venting the compressed noncondensible gases into a rejection well;

(e) a pump for pressurizing condensate from the primary condenser; and (f) a conduit for returning the pressurized condensate to a rejection well.

10. A power plant according to claim 9 wherein said means for compressing includes an ejector compressor driven by pressurized condensate.

* * * * *